United States Patent [19]
Wert

[11] 4,016,970
[45] Apr. 12, 1977

[54] BULK BIN DISCHARGE CONTROL BOOT

[75] Inventor: John M. Wert, South Bend, Ind.

[73] Assignee: Chore-Time Equipment, Inc., Milford, Ind.

[22] Filed: Nov. 26, 1975

[21] Appl. No.: 635,433

Related U.S. Application Data

[63] Continuation of Ser. No. 361,506, May 18, 1973, abandoned.

[52] U.S. Cl. .............................. 198/524; 198/548; 198/558
[51] Int. Cl.² ........................................ B65G 65/46
[58] Field of Search .......... 214/17 R, 17 D, 17 DA; 222/154, 156, 288, 328, 270, 547, 564, 575; 198/52, 64, 548, 558, 857

[56] References Cited

UNITED STATES PATENTS

| | | | |
|---|---|---|---|
| 2,055,139 | 9/1936 | Andrews | 198/52 |
| 2,249,372 | 7/1941 | Askenback | 198/64 X |
| 2,943,752 | 7/1960 | Platt | 214/17 D |
| 3,100,052 | 8/1963 | Brembeck | 198/64 X |
| 3,283,925 | 11/1966 | Gutekunst | 214/17 D |
| 3,498,479 | 3/1970 | Weaver et al. | 214/17 DA |
| 3,722,715 | 3/1973 | Young | 214/17 D |

Primary Examiner—Robert G. Sheridan
Attorney, Agent, or Firm—Olson, Trexler, Wolters, Bushnell & Fosse, Ltd.

[57] ABSTRACT

A boot is disclosed for connecting an automatic feeding system bin to a conveyor. The internal pressure of feed flowing from the bin to the conveyor is reduced by a boot collar. The cross-sectional area of the flow is reduced by an attached upper boot member. The associated conveyor can be located at any of a number of angularly spaced positions by a collar-upper boot member interconnection. A regulator is included to adjust the maximum feed flow and to halt the flow, thereby permitting downstream parts to be removed. If desired, a lower boot member can be included to introduce the feed flow to the conveyor, and an associated sensor can halt the conveyor when the absence of feed in the lower boot member is sensed.

11 Claims, 7 Drawing Figures

TO MOTOR
FOR CONVEYOR 15

BULK BIN DISCHARGE CONTROL BOOT

This is a continuation of application Ser. No. 361,506, filed May 18, 1973, now abandoned.

BACKGROUND OF THE INVENTION

This invention relates generally to boots or feed transfer devices for agricultural feeding systems.

Automated feed storage and delivery systems for poultry and like animals have met with widespread commercial success. Many such systems utilize one or more large bins for preliminarily storing the feed and one or more conveyors for moving the stored feed from the bin to intermediate hoppers or dispensing stations. The device by which feed is transferred from a bin to a conveyor is often referred to as a boot, and it is an important part of an automated feeding system.

It is the general object of this invention to provide an improved boot for transferring feed and like free-flowing materials from a bulk storage container bin to a conveyor. A related general object is to provide a boot device by which this feed transfer can be controlled.

More specifically, it is an object to provide a bulk feed bin boot which relieves the pressure normally exerted by feed upon the associated conveyor end.

It is another specific object to provide a boot which can be connected, if desired, to any one of a number of different sized conveyors. The conveyor, in turn, can be oriented in any of a wide variety of positions relative to the storage bin.

It is another specific object of the invention to provide a boot which will maintain a smooth and positive flow of feed from the bin to the conveyor.

Another object is to provide a boot which will permit substantially all the feed to be drawn out of the bin and boot by the associated conveyor.

It is yet another object to provide a boot mechanism which will permit the associated conveyor to be halted in its operation when no feed is being received by it, thereby preventing conveyor wear and other detrimental effects.

It is a further object to provide a boot which will permit the flow of feed to the conveyor to be shut off even when the bin still contains stored feed.

It is a still further object of the invention to provide a feed storage bin boot which will permit the associated conveyor to be removed for maintenance or for other purposes even when the associated bin is partially or completely full of feed.

It is a still further object of the invention to provide a boot which will permit more than one bin to be operatively connected to the associated conveyor, thereby increasing the effective amount of system storage capacity available and permitting the introduction of several differing types of feed to be introduced to the conveyor.

It is another object of the invention to provide a boot which will permit direct control of the amount of feed which can be introduced to the conveyor over any given period of time.

Other objects and advantages of the invention will become apparent upon reading the following detailed description and upon reference to the drawings. Throughout the descriptions, like reference numerals refer to like parts.

DETAILED DESCRIPTION

While the invention will become described in connection with a preferred embodiment, it will be understood that it is not intended to limit the invention to that embodiment. On the contrary, it is intended to cover all alternatives, modifications and equivalents as may be included within the spirit and scope of the invention.

Figure 1:
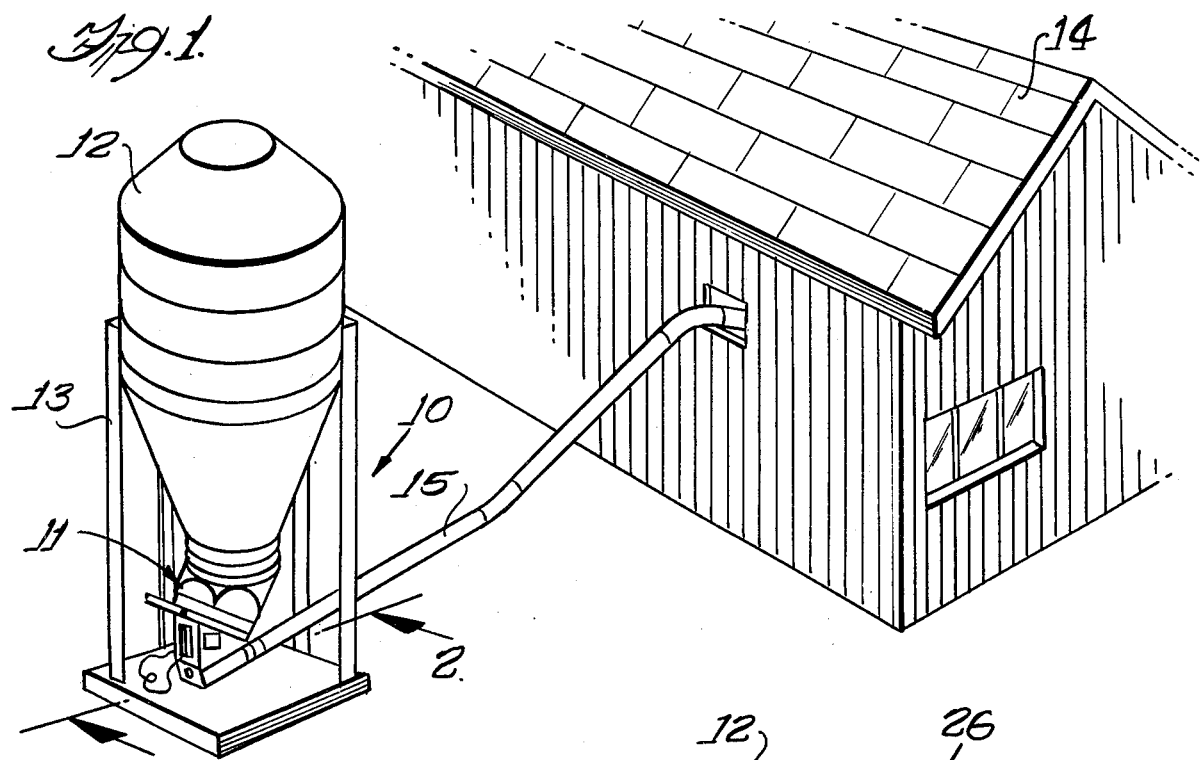
FIG. 1 is a perspective view showing a portion of the feeding system with which the present invention is associated.
Figure 2:
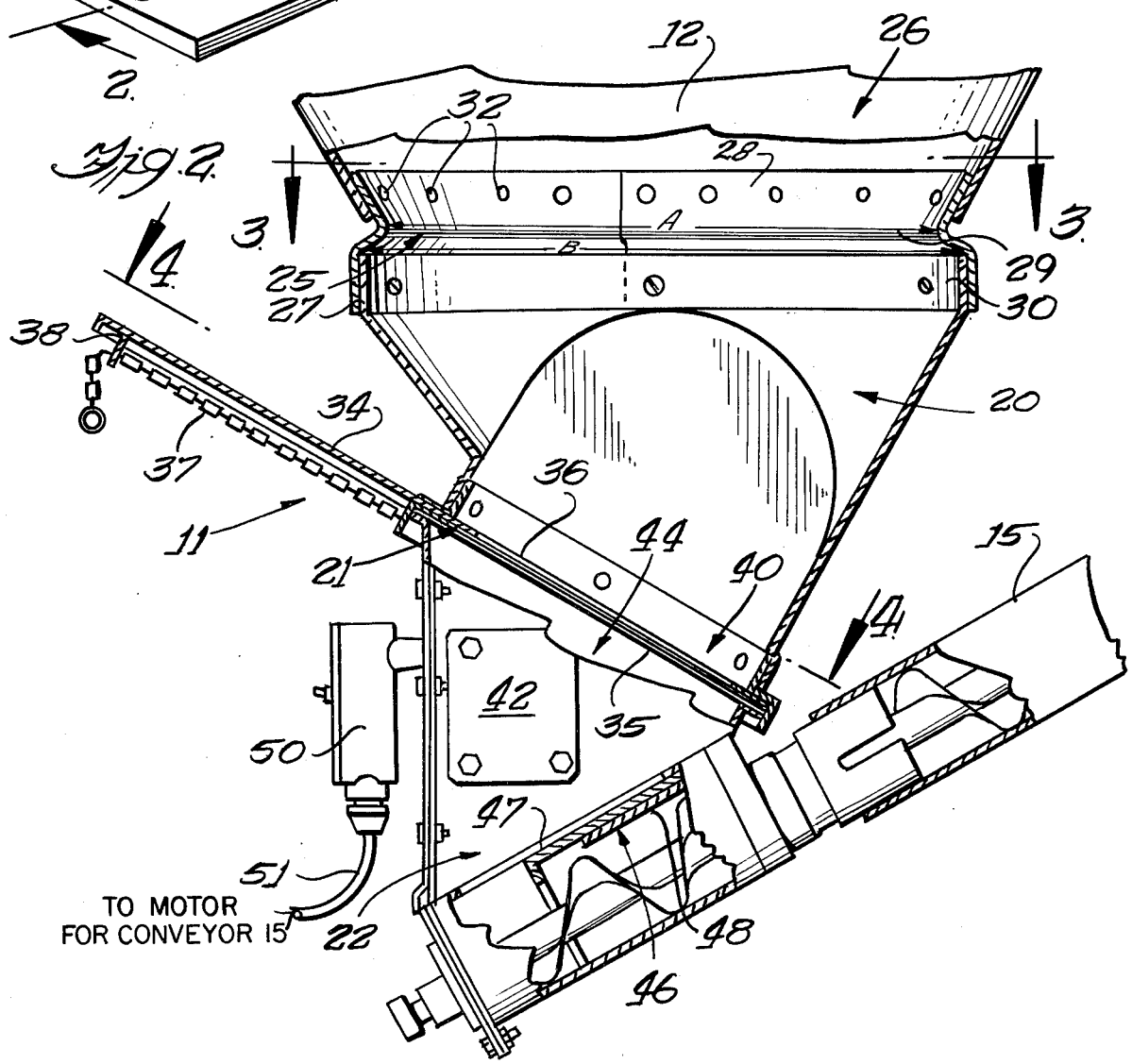
FIG. 2 is an elevational view of the feed system boot of the present invention, portions being broken away to expose further details.
Figure 3:
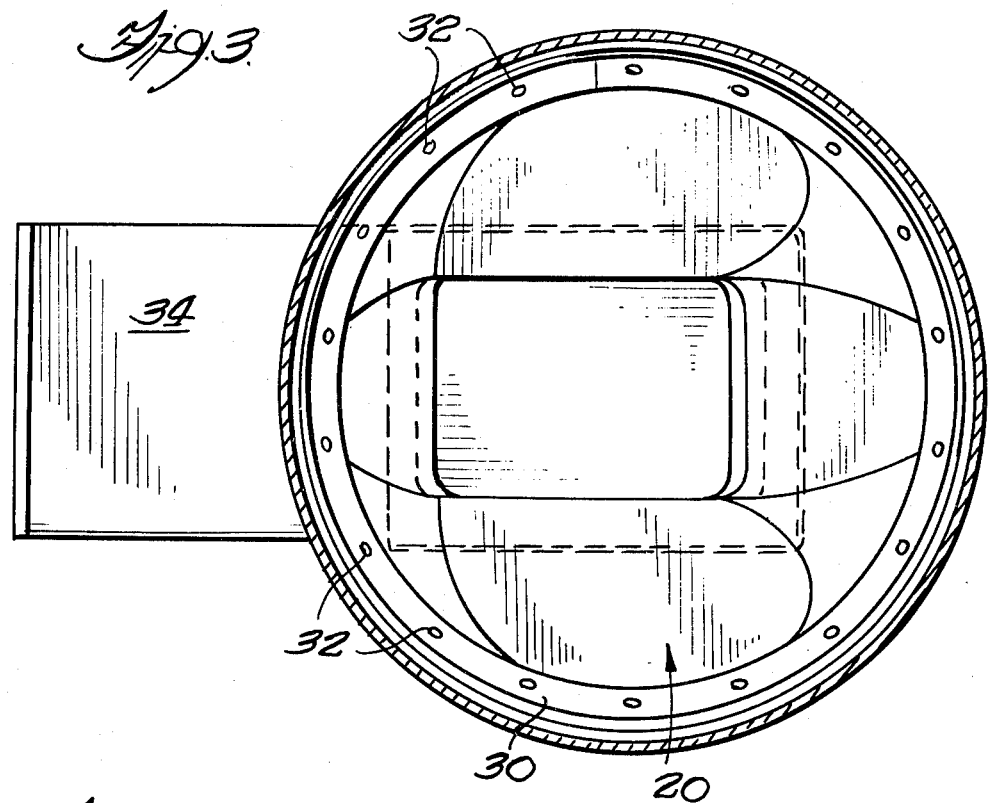
FIG. 3 is a sectional view of the upper boot member and feed flow regulator being taken substantially in the plane of line 3—3 in FIG. 2.
Figure 4:
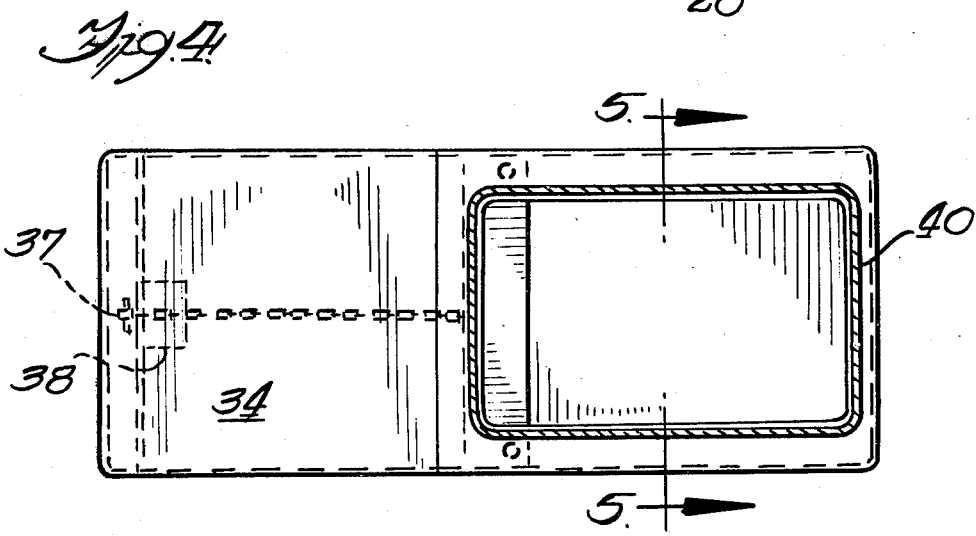
FIG. 4 is a sectional view taken substantially in the plane of line 4—4 in FIG. 2 and showing in further detail the feed flow regulator device.
Figure 5:
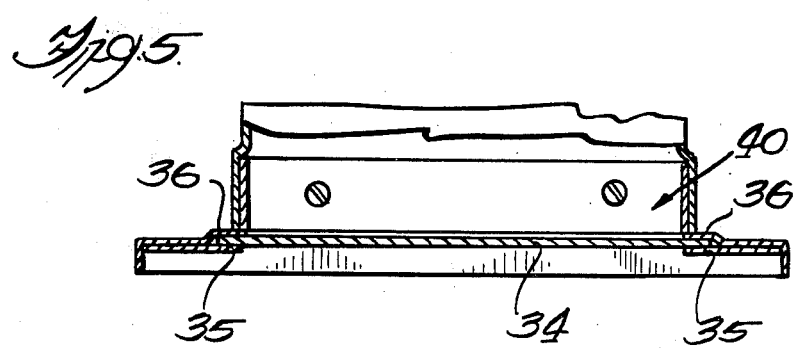
FIG. 5 is a partially sectioned view taken substantially in the plane of line 5—5 in FIG. 4 and showing in further detail the feed flow regulator.

Turning more specifically to the drawings, FIG. 1 shows a feed system 10 including the novel boot 11 of the present invention. In general, the feed system 10 comprises a large storage bin 12 which may be mounted by appropriate support structure 13 outside a poultry house 14 or other animal shelter. Feed is moved from the storage bin 12 into the poultry house 14 by a conveyor 15; the novel boot 11 interconnects the bin 12 and conveyor 15 for introducing and controlling the flow of feed from the bin 12 to the conveyor 15. As illustrated in FIG. 2, this boot may be considered to comprise an upper boot member 20 for receiving the feed flow from the bin 12, and a regulator 21 for selectively restricting the cross-sectional area of feed flow through a range of area sizes as flow passes from the bin 12 to the conveyor 15. A lower boot member 22 is here included for receiving the feed flow from the regulator 21 and introducing it to the conveyor 15.

As will be understood from the above description, a relatively large volume and weight of feed may be stored in the bin 12. Thus, the feed passing from the bottom 26 of the bin 12 to the boot 11 may be pressed upon with considerable weight by feed located higher in the bin, thereby imparting considerable internal pressure to the feed flow. Such weight and internal feed flow pressure can cause objectionable wear and damage to boot parts and conveyor parts. To reduce this internal feed flow pressure in accordance with one aspect of the invention, therefore, a bin collar 25 is interposed between the bottom 26 of the bin 12 and the mouth or top 27 of the upper boot 20. This bin collar 25 is provided, below a mouth 28, with a neck portion 29 of relatively small cross-sectional area and diameter A, an exhaust portion 30 of relatively large cross-sectional area diameter B which cooperate to reduce the internal pressure of feed flowing through the collar.

It is a feature of the invention that the novel boot 11 permits the associated conveyor 15 to be attached to the bin 12 at any of a number of angularly spaced positions, thereby providing great flexibility in the construction locations and arrangements for the feed system 10 itself. To this end, the bin bottom 26 and the bin collar means 25 are provided with a series of mating equi-angularly spaced holes 32. Connector pins (not shown) can be used to secure the bin collar 25 to the bin 12 at any of a plurality of angularly spaced positions, thereby permitting orientation of the appended conveyor 15 at any corresponding angular position for appropriate connection to remaining portions of the feed system.

In operating modern feeding systems, it has been found desirable to be able to control the flow of feed from the bin 12 to the conveyor 15. Moreover, it is sometimes necessary to remove the conveyor 15 from the bin 12 in order to perform maintenance upon the bin or conveyor, even when the bin 12 is partially or completely filled with feed. In further accordance with the invention, therefore, the boot regulator 21 includes a sliding gate valve member 34 mounted upon guides 35 and 36 for selective insertion into the feed flow stream. An adjustment device such as a chain 37 and a chain lock member 38 are secured to the boot 11 to permit the selective insertion of the gate valve member 34 into the feed flow stream throughout a range of positions. Since the gate valve guides 35 and 36 extend across the entire regulator 21, the gate valve member 34 can be inserted entirely across the regulator 21 to completely halt feed flow. When feed flow is thus halted, the lower boot member 22 and associated conveyor 15 can be removed for maintenance or for other reasons.

To accommodate a gate valve member 34 of an economical size and to prevent wear upon guides 35 and 36 of over-extended dimension, the upper boot member 20 is provided with a relatively large mouth 30 of circular cross-section and a relatively small exhaust 40 of rectangular cross-section formed at an angle to the mouth 30 and oriented parallel to the sliding gate valve 34. The small exhaust 40 and large mouth 30 reduce the cross-section area of the feed flow to permit its economical manipulation by the gate member 34. By appropriately setting the gate member 34, the maximum amount of feed deliverable to the lower boot member 22 and conveyor 15 which can be introduced to the conveyor over any given period of time can be directly controlled by the regulator.

In using modern feeding systems, it is sometimes desirable to connect a plurality of bins to a single conveyor in order to provide increased feed storage capacity, or to permit the introduction of alternate feed mixes to the conveyor and down stream system with ease and convenience. In accordance with yet another aspect of the invention, therefore, the lower boot member 22 is provided with a side panel 42 which can be removed to permit an additional feed input conveyor (not shown) or other device to be connected to the boot 11. In addition, this side panel 42 or other side panels (now shown) can be removed providing access to the boot and bin interior. Through such access panels, unused feed can be removed from the boot and associated storage bin without disconnecting the entire feeding system from the bin, and minor system stoppages and repairs can be made with minimum disassembly effort.

To receive the feed flow and conduct it to remote dispensing stations or other intermediate hoppers, the conveyor 15 is connected to the lower extremity of the lower boot 22. It is a feature of the invention that feed is conveyed away from the bottom of the boot 11 in an upward direction to elevate it for gravitational dispensation and other purposes. In accordance with this feature of the invention, the conveyor 15 is oriented at an opposite angle to the lower boot member mouth 44 and the regulator guide valve 34.

In accordance with yet another aspect of the invention, final adjustment of the feed flow into the conveyor 15 is provided by a slide tube device 46. As illustrated in FIG. 2, this device 46 includes a slide tube 47 telescopically disposed over and around a fixed conveyor mouth member 48. By adjusting the position of the slide tube 47, the flow of feed into the conveyor 15 from the lower boot means 22 can be adjustably restricted.

In accordance with a further aspect of the invention, needless wear and tear upon the conveyor 15 and other moving parts of the system are automatically prohibited. To this end, a sensor switch 50 is mounted to the lower boot with a probe (not shown) carried inside the boot member 22 to sense the presence or absence of feed. Should the absence of feed in the lower boot member 22 be sensed, due to either exhaustion of the bin feed supply, to inadvertent bridging of the feed within the bin or upstream portions of the boot, or to feed flow shut-off by operation of the regulator 21, the sensor 50 provides an appropriate signal, by lead wires 51 or other convenient means, to halt opertion of the conveyor 15.

Figure 6:
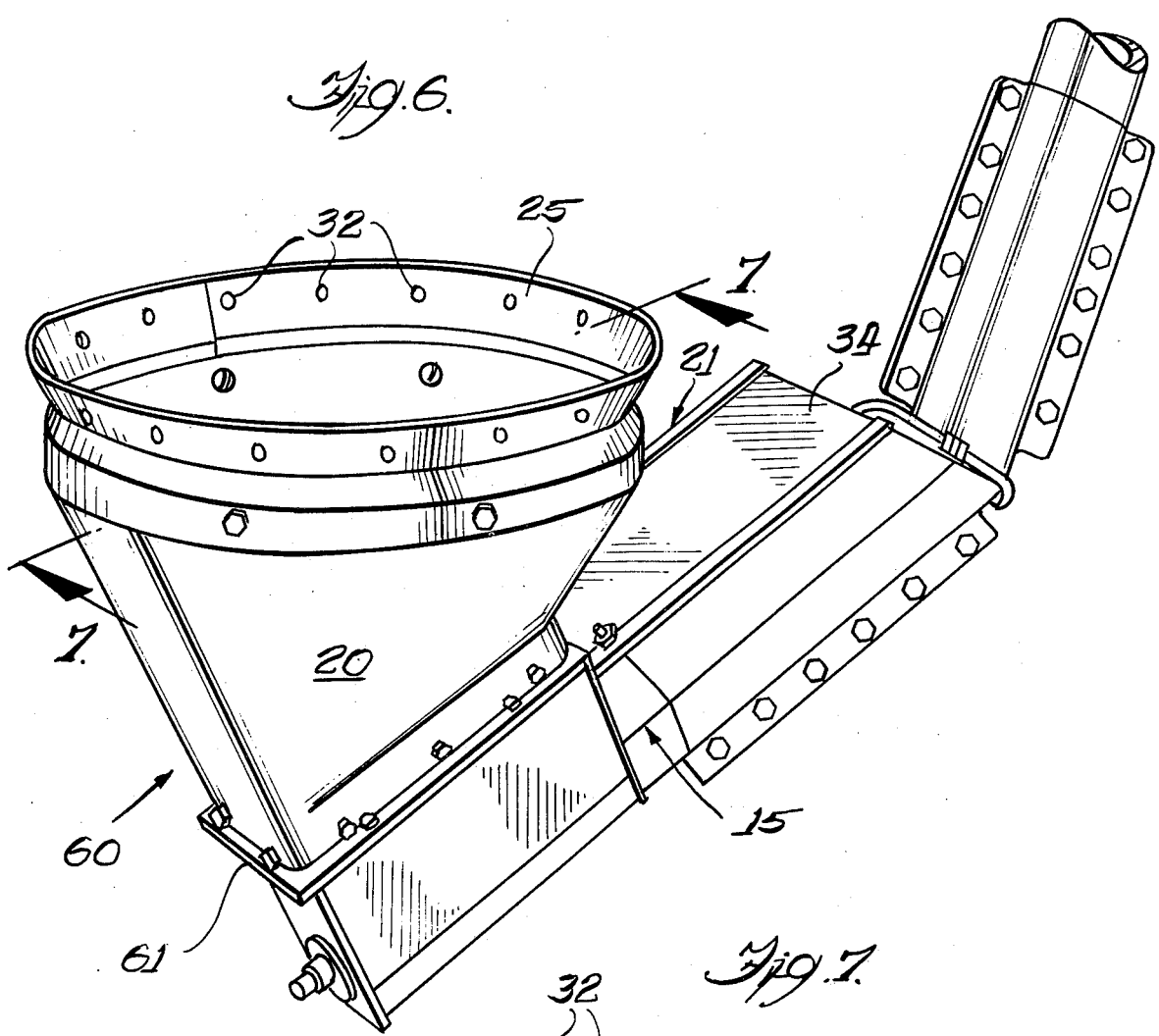
FIG. 6 is a perspective view of an alternate embodiment of the boot invention.
Figure 7:
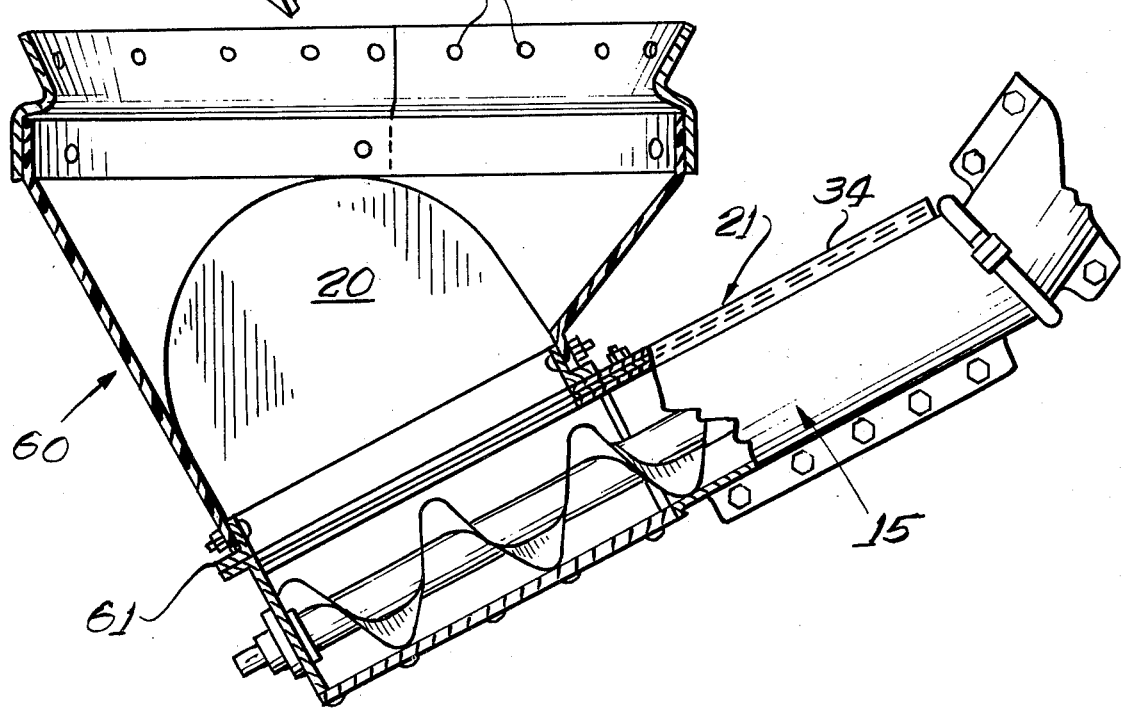
FIG. 7 is a partially sectional view taken in the plane of line 6—6 in FIG. 7 and showing further details of the alternate embodiment.

It is a feature of the invention that costs can be reduced by eliminating the lower boot and associated parts. As shown in FIGS. 6 and 7, the boot assembly 60 does not include a lower boot member and the associated cover plates and conveyor control switch. Rather, the conveyor 15 is provided with an adapter flange 61 which is attached directly to the regulator 21, thus orienting the feed-receiving portion of the conveyor directly below the pin.

The following is claimed as the invention:

1. A device for receiving and controlling a flow of particulate feed and the like from a bin, comprising bin collar means having a relatively small neck of unbroken circular shape and a relatively large exhaust of unbroken circular shape for receiving the feed flow and reducing the internal pressure of the feed flow, upper boot means for receiving the feed flow from the bin collar means, regulator means inclined upwardly in a given direction and attached to the upper boot means for selectively restricting the cross-sectional area of feed flow through a range of area sizes, lower boot means attached to the regulator means for receiving the feed flow having a lower boot exhaust inclined upwardly at an angle and an orientation opposite to that of the regulator means for introducing the feed flow to a feed conveyor means and switch means having a sensor means extending into the lower boot means between the regulator means and the conveyor means for halting operation of the conveyor means in response to the absence of feed flow, and thereby preventing unnecessary wear of the feed conveyor.

2. A boot according to claim 1 wherein said upper boot means is provided with a relatively large mouth and a relatively small exhaust for reducing the cross-sectional area of the feed flow.

3. A boot according to claim 2 wherein said upper boot means mouth is relatively circular in cross-section and the upper boot exhaust is relatively rectangular in cross-section.

4. A boot according to claim 3 wherein said bin collar means includes means for connecting said upper boot means to the bin collar means in any of a plurality of angularly spaced positions.

5. A boot according to claim 1 wherein said regulator means includes a sliding gate valve member mounted for selective insertion into the feed flow stream throughout a range of positions.

6. A boot according to claim 5 wherein upper boot means is provided with an exhaust, and said sliding gate valve means is oriented parallel to said upper boot exhaust.

7. A boot according to claim 1 wherein said lower boot means includes at least one removable access panel permitting access to the interior of said boot.

8. A boot according to claim 1 including a removable side panel permitting an additional feed input means to be connected to the boot to allow the introduction of additional feed to the boot.

9. A boot according to claim 1 wherein said lower boot means is provided with a pre-oriented mouth, the boot including conveyor support means communicating with said lower boot means for receiving said feed flow and being oriented at an angle to said regulator and said mouth of the lower boot means.

10. A boot according to claim 9 wherein said regulator means and said conveyor support means are mounted at oppositely oriented angles of inclination of a vertical plane.

11. A boot according to claim 9 including sliding tube means disposed in said conveyor support means for adjustably restricting the flow of feed into said conveyor means from said lower boot means.

* * * * *